US006170031B1

United States Patent
Clay

(10) Patent No.: US 6,170,031 B1
(45) Date of Patent: Jan. 2, 2001

(54) READ/WRITE STATE MACHINES FOR TRANSFERRING DATA TO/FROM HOST INTERFACE IN A DIGITAL DATA STORAGE SYSTEM

(75) Inventor: Donald Clay, Louisville, CO (US)

(73) Assignee: Seagate Technology LLC, Scotts Valley, CA (US)

(*) Notice: Under 35 U.S.C. 154(b), the term of this patent shall be extended for 0 days.

(21) Appl. No.: 08/889,360

(22) Filed: Jul. 8, 1997

(51) Int. Cl.[7] .................................................. G06F 13/00
(52) U.S. Cl. ........................... 710/130; 710/74; 711/112; 711/4
(58) Field of Search .............................. 710/22, 130, 27, 710/74; 711/112, 4

(56) References Cited

U.S. PATENT DOCUMENTS

| | | | |
|---|---|---|---|
| 5,075,805 | * 12/1991 | Peddle et al. ........................ 360/61 |
| 5,150,465 | * 9/1992 | Bush et al. . | |
| 5,175,825 | * 12/1992 | Starr .................................... 709/213 |
| 5,276,662 | * 1/1994 | Shaver, Jr. et al. .................. 369/32 |
| 5,448,709 | * 9/1995 | Chandler et al. ..................... 710/52 |
| 5,465,338 | * 11/1995 | Clay ..................................... 710/130 |
| 5,517,325 | * 5/1996 | Shimatani ............................ 710/22 |
| 5,553,307 | * 9/1996 | Fujii et al. ........................... 710/25 |
| 5,586,248 | * 12/1996 | Alexander et al. .................. 714/22 |
| 5,603,050 | * 2/1997 | Wolford et al. ..................... 710/1 |
| 5,687,389 | * 11/1997 | Packer .................................. 710/5 |
| 5,758,188 | * 5/1998 | Appelbaum et al. ................ 710/35 |
| 5,761,406 | * 6/1998 | Kobayashi et al. ................. 714/24 |
| 5,826,107 | * 10/1998 | Cline et al. .......................... 710/27 |
| 5,838,892 | * 11/1998 | Wilson ................................. 714/799 |

* cited by examiner

*Primary Examiner*—Paul R. Myers
(74) *Attorney, Agent, or Firm*—Flehr Hohbach Test Albritton & Herbert LLP

(57) ABSTRACT

In a storage system such as an ATA compatible flash disk drive, it is common to use state machines to automate the transfer of data between a buffer in the storage system and the host processor. Four state machines are typically provided: an Update Task File state machine, a Byte Count state machine, a Read State Machine, and a Write State Machine. In the prior art, the Read and Write State machines did not allow the microcontroller to intervene between transfers of sectors or blocks in multiple (blocked) commands. Furthermore, the prior art Read State Machine and Write State Machine did not allow for the automation of DMA commands. Finally, the prior art Read State Machine and Write State Machine required too much time between sectors and between blocks. Therefore, an improved Read State Machine and an improved Write State Machine are provided which allow the microcontroller to intervene between transfers, allow the automation of DMA commands, and reset outstanding commands which are active. Furthermore, the Read State Machine and Write State Machine of the present invention require fewer state times between sectors, allowing faster data transfers.

8 Claims, 10 Drawing Sheets

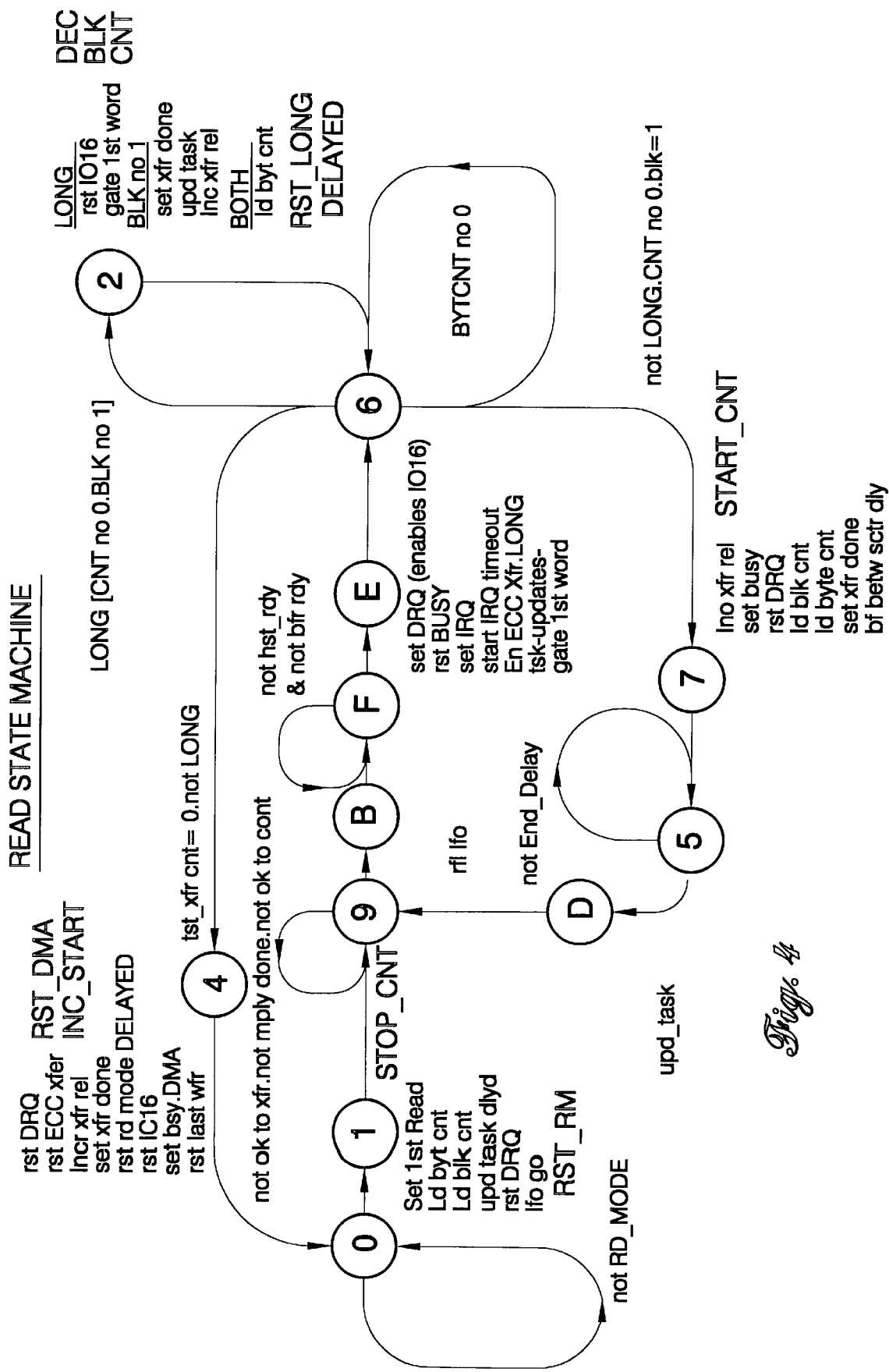

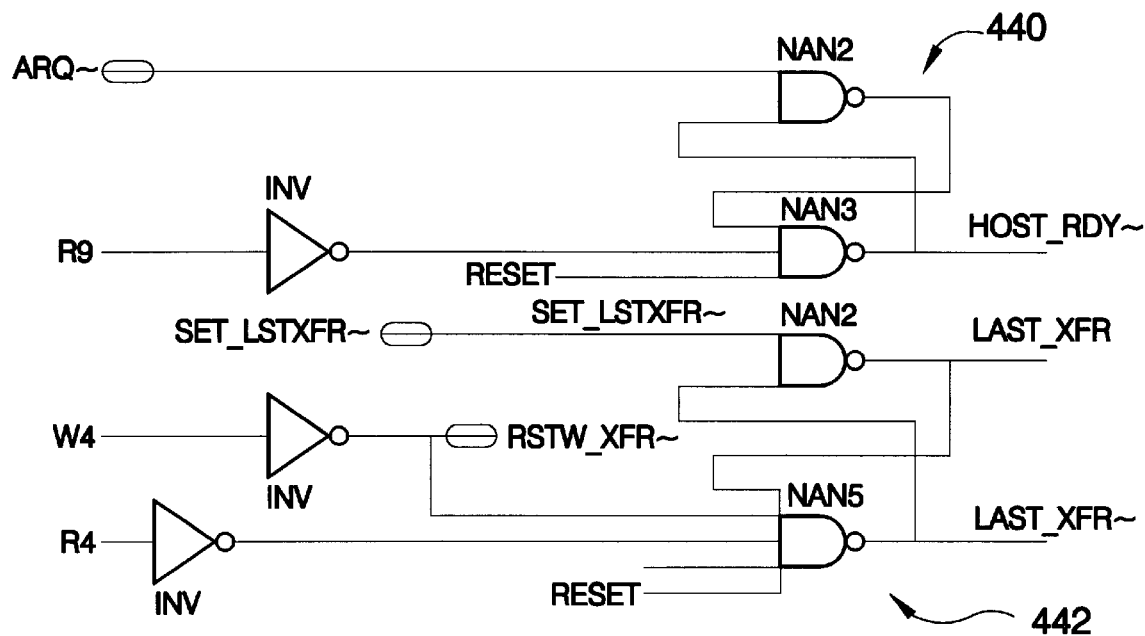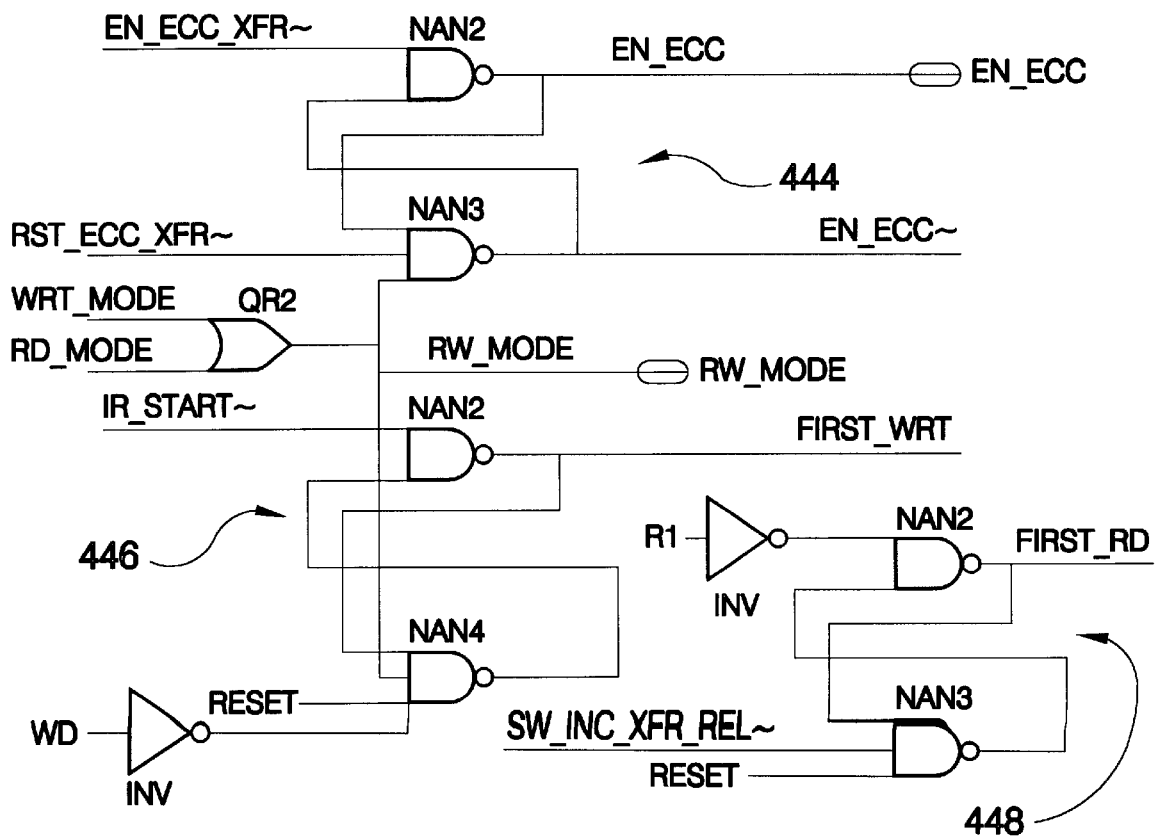
Fig. 6c

READ/WRITE STATE MACHINES FOR TRANSFERRING DATA TO/FROM HOST INTERFACE IN A DIGITAL DATA STORAGE SYSTEM

BACKGROUND OF THE INVENTION

The present invention relates generally to digital data storage systems and more particularly to an AT interface architecture employing state machines for use in a digital data storage system.

The use of state machines in the AT interface architecture of digital storage systems, and particularly of a flash solid state memory system has been described in U.S. Pat. No. 5,465,338, which patent is hereby incorporated by reference.

As described therein, a microcontroller controls the operation of a typical digital storage system. One function of the microcontroller is to transfer data between the host computer and buffer memory in response to read and write commands from the host computer. This transfer is automated by the inclusion of state machines in the AT interface. Four state machines are typically provided. A read state machine controls all aspects of READ commands, eliminating host related microcontroller activity during READ commands. A WRITE state machine controls all aspects of WRITE commands, eliminating host related microcontroller activity during WRITE commands. An UPDATE TASK FILE state machine is provided keep track of the data address and the number of sectors transferred upon request from either the WRITE or the READ state machine. Finally, a BYTE COUNT state machine controls the transfer of a sector of data between the host and the buffer.

As described, the four state machines eliminate microcontroller activity during READ and WRITE operations. However, the state machines do not provide for auto-writes on DMA commands, nor allow DMA commands to be blocked (multiple) commands. Furthermore, the state machines require a fixed amount of time between the transfer of sectors. This time requirement limits how fast the state machines can transfer multiple sectors. Consequently, the state machines, as described, cannot transfer data at the speeds desired by today's fast host computers. Finally, the microcontroller is only allowed to intervene at the start of a data transfer.

SUMMARY OF THE INVENTION

Accordingly, it is an object of the invention to provide an AT interface architecture comprised of state machines which provide for auto-writes of DMA commands, allow DMA commands to be blocked (multiple) commands, and allow the microprocessor to intervene between transfers of sectors in a block.

Another object of the invention is to provide a READ state machine which requires only one state time between sectors, and only seven state times between blocks.

Another object of the invention is to provide a WRITE state machine which requires only one state time between sectors, and only five state times between blocks.

BRIEF DESCRIPTION OF THE DRAWINGS

FIG. 4 is a flow chart setting forth the operation of the Read State Machine according to the present invention.

FIGS. 6A, 6B and 6C are a logic diagram of the control logic controlled by both the Read State Machine and the Write State Machine for providing control signals to the storage system during a read and a write operation and to the host computer during a read and a write operation.

DETAILED DESCRIPTION OF A PREFERRED EMBODIMENT

Figure 1:
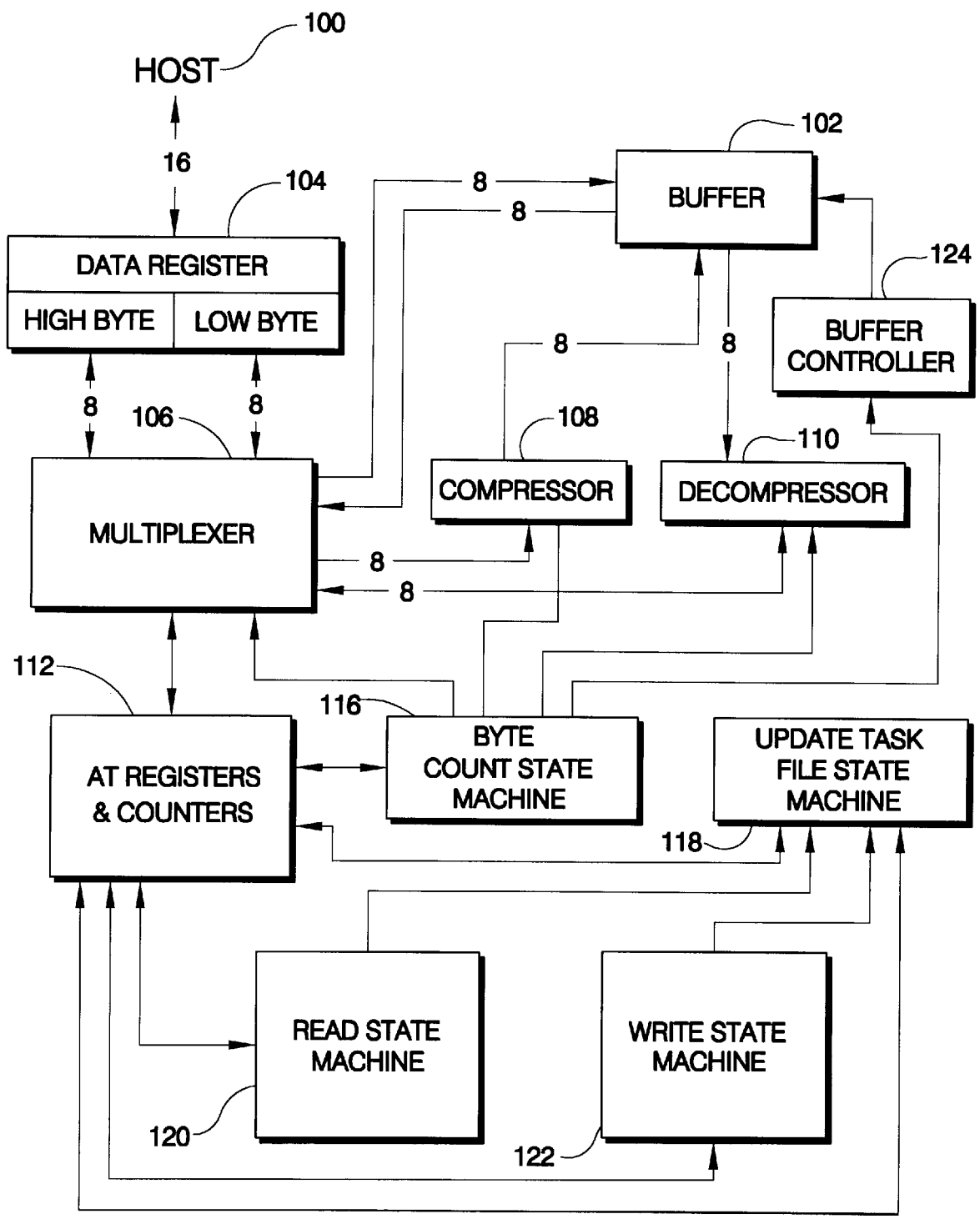
FIG. 1 depicts the AT interface circuit of a typical mass storage system including the state machines.

FIG. 1 is an overview of the major components of the AT architecture involved in the transfer of data between the host computer 100 and the buffer 102. In a WRITE command the host computer 100 places a data word, two bytes, into the data register 104. Then, the data word is transferred as two bytes of data via the multiplexer 106 either directly to the buffer 102 if there is to be no compression, or to compressor 108 and then to buffer 102 if there is to be compression. In the READ command, if the data is uncompressed, two bytes of data will be transferred from the buffer 102 via the multiplexer 106 to the data register 104 and finally as a data word to the host computer 100. If the data is compressed, the data will be transferred from the buffer 102 to the decompressor 110 where the data will be decompressed. Then, two bytes of decompressed data will be transferred from the decompressor 110 via the multiplexer 106 to the data register 104. From the data register 104, a data word will be transferred to the host computer 100.

The AT registers 112 can be accessed by the host 100 and the state machines 116, 118, 120, and 122. The AT registers 112 contain information for controlling the transfer of data during a READ or WRITE operation. The Byte Count State Machine 116 controls the transfer of a sector of data between the data register 104, buffer 102, compressor 108, and decompressor 110. The Update Task File State Machine 118 determines when all sectors have been transferred and will cause the sector address to be incremented if another sector is to be transferred. The Read State Machine 120 controls all READ commands. The Write State Machine 122 controls all WRITE commands. The relationship of the components shown in FIG. 1 is typical of both the prior art and the present invention.

The operation of the state machines are intertwined in the following fashion. The Read and Write State Machines 120 and 122 control the overall operation of the data transfer and are mutually exclusive. That is, when the Read State Machine 120 is active, the Write State Machine 122 is inactive, and when the Write State Machine 122 is active, the Read State Machine 120 is inactive. At the point of the data transfer for either a read/write operation when the Task File needs to be updated, either of the Read or Write State Machine will activate the Update Task File state machine 118. During read operations, the Read State Machine 120 issues the signal, GATE 1ST READ to tell the Byte Count State Machine 116 to stage the first two bytes so that they will be ready when the Host computer 100 starts reading the data.

The state machines require many registers to perform correctly. These registers are located in the AT registers 112 or with the buffer controller 124. The Task File's Count Register is used to keep track of the number of sectors transferred. The head and sector configuration registers are used to determine when the Task File's SDH and Sector Register should be wrapped. The Byte Count Register, which is fed from the ECC Size Register and the Transfer Size Register, is used to count the number of bytes in a sector or the number of ECC bytes to be transferred. The Block Count Register is loaded with a one (1) for all but multiple transfer operations. In that case, it is loaded with the Block Count Size Register, which contains the number of sectors to be transferred in each block. The Block Count Register has circuitry to detect when it is 0, 1 and 2. For buffer management, transfers are checked and controlled by the Write Segment Size, Sectors Available (SAV), Sectors Adjust (SAD) and Block Count Registers. The operation of these registers is further described in the prior art reference described above.

The structure and function of the Update Task File State Machine 118, the Byte Count State Machine 116, and the registers and signals used by the system in FIG. 1 are thoroughly described in the prior art. The structure and function of the Read and Write State Machines of the present invention will now be described. In each case, the time required by a state machine to move from state to state is referred to as the state time.

1. Write State Machine

Figure 2:
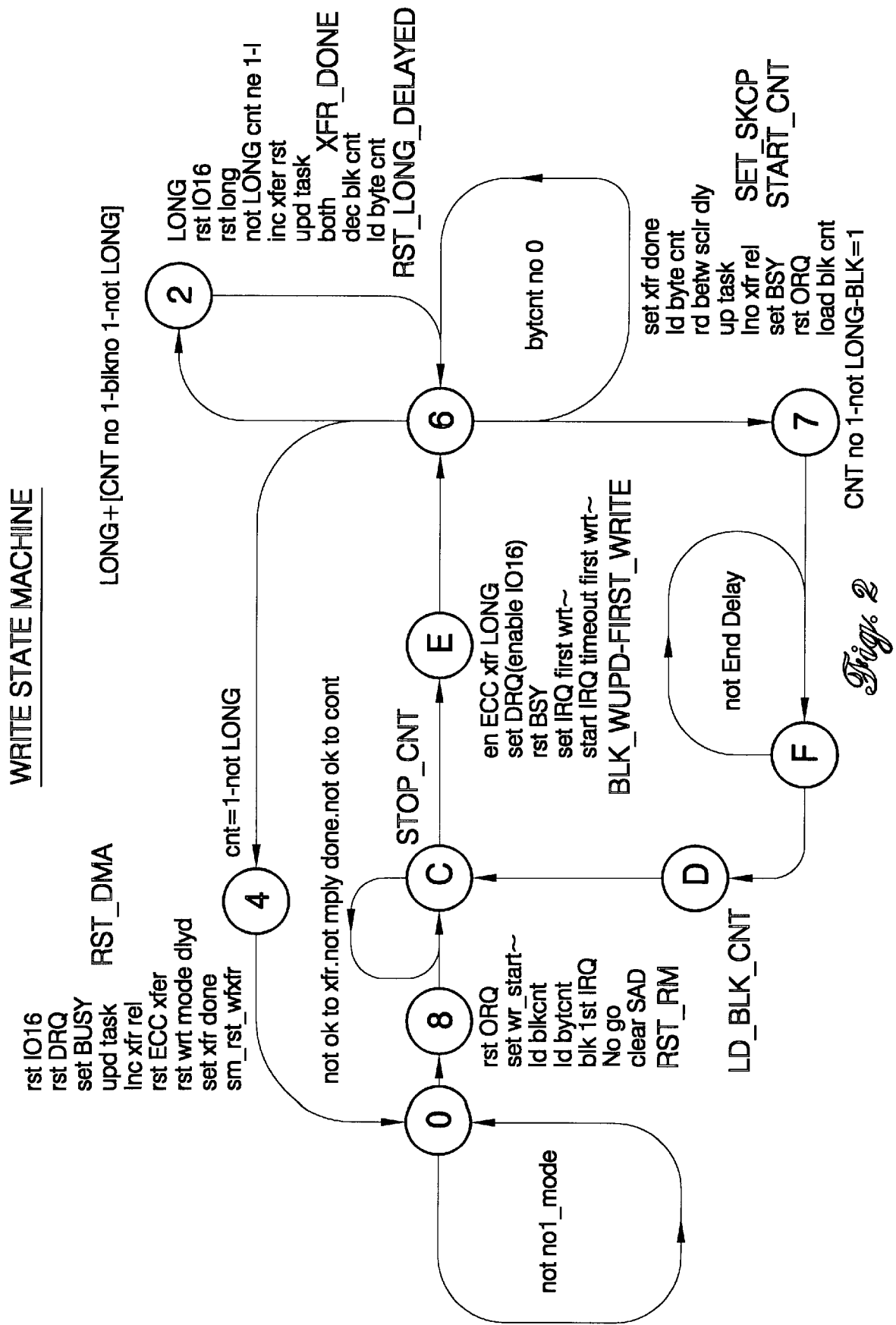
FIG. 2 is a flow chart setting forth the operation of the Write State Machine according to the present invention.
Figure 3A:
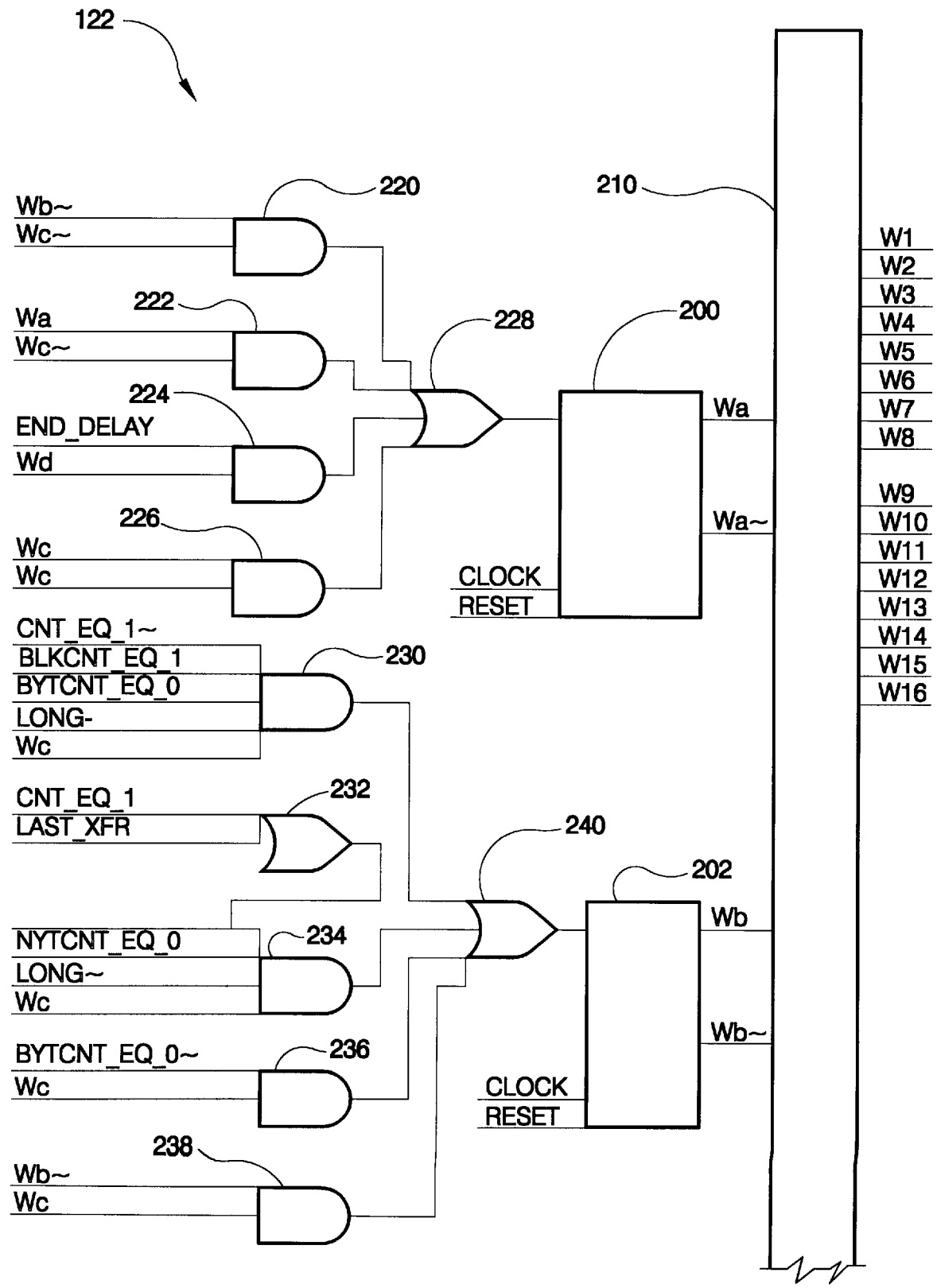
FIGS. 3A and 3B are a logic diagram of the Write State Machine According to the present invention.
Figure 3B:
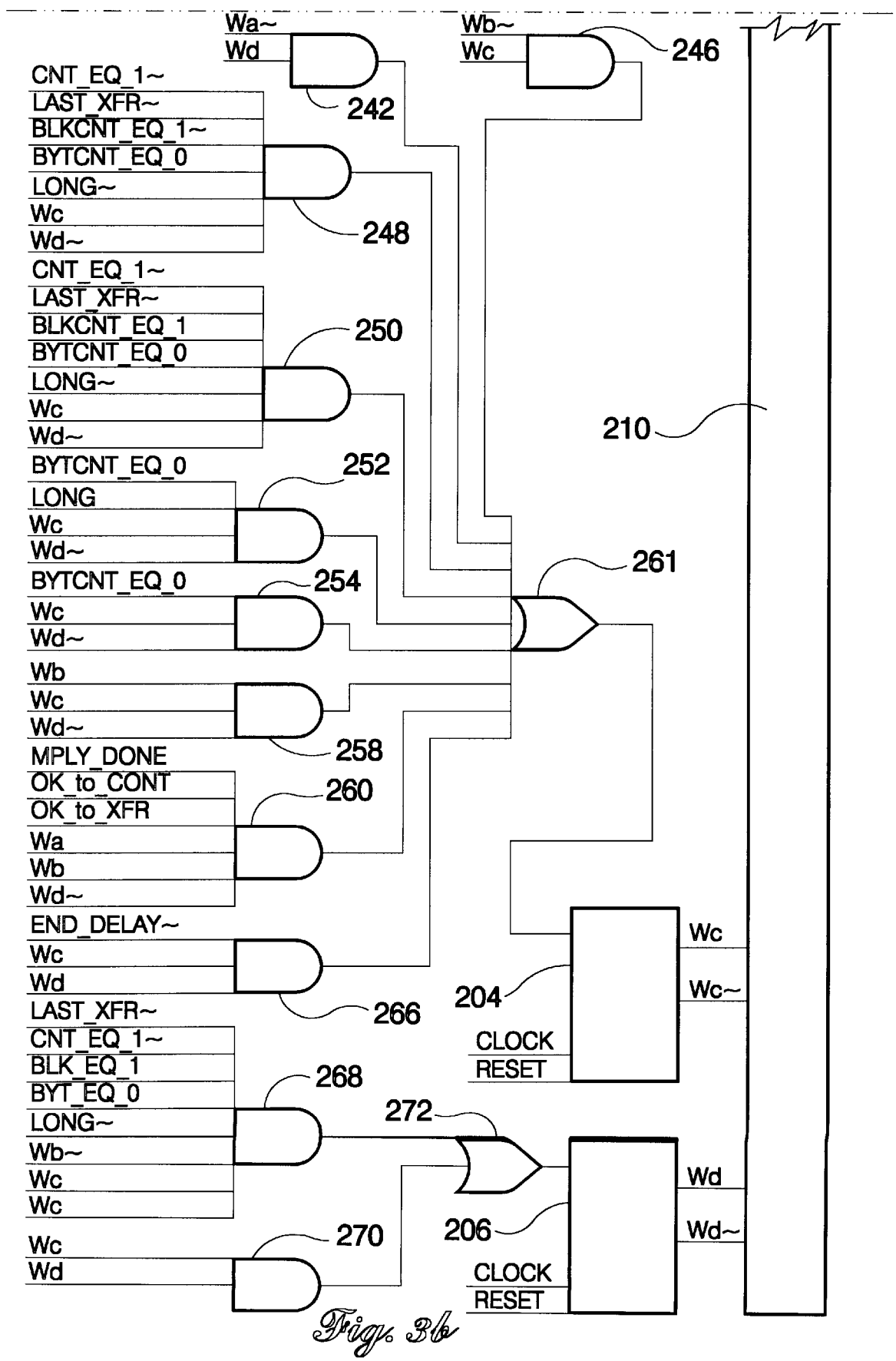
Figure 6A:
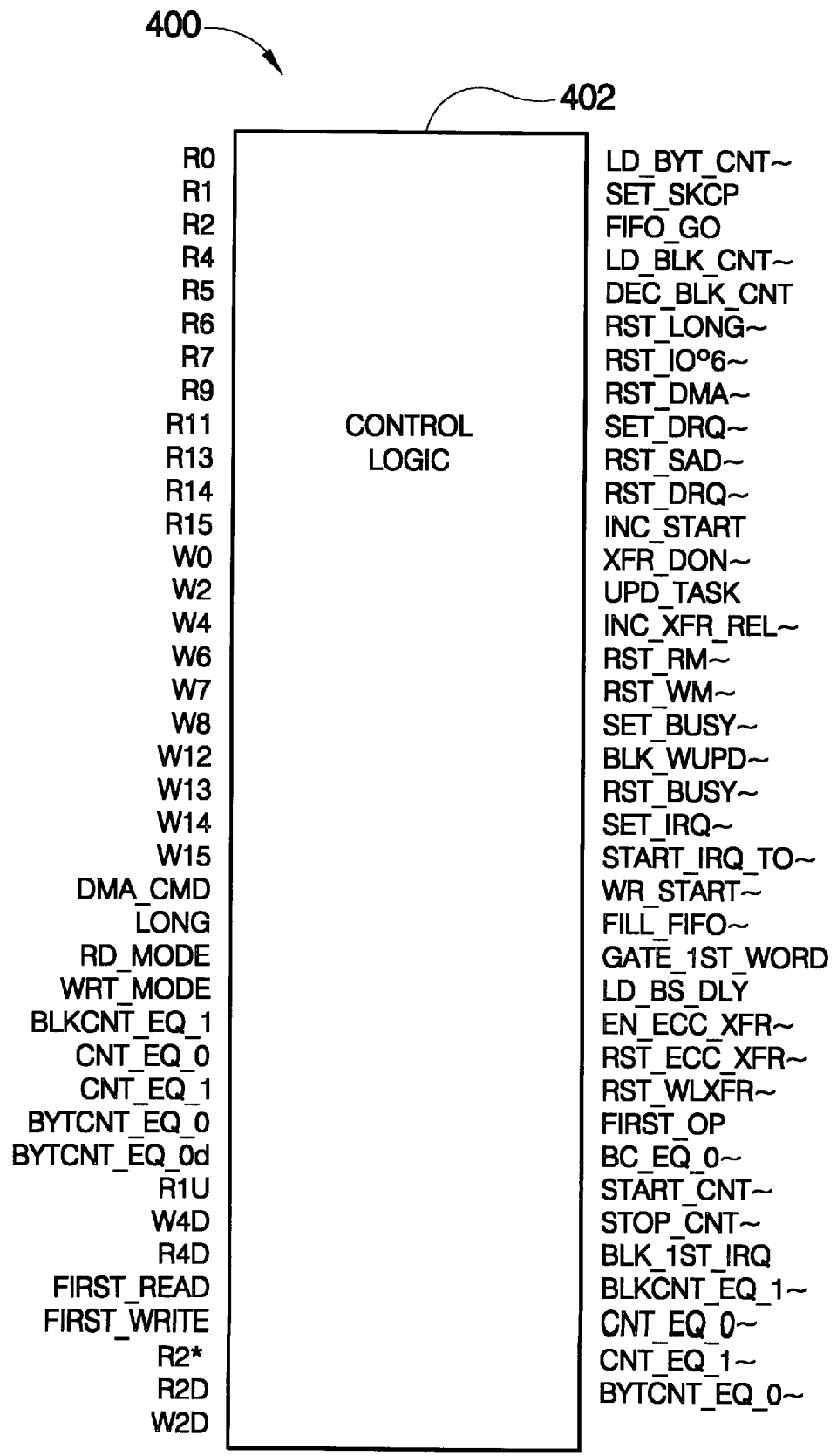
Figure 6B:
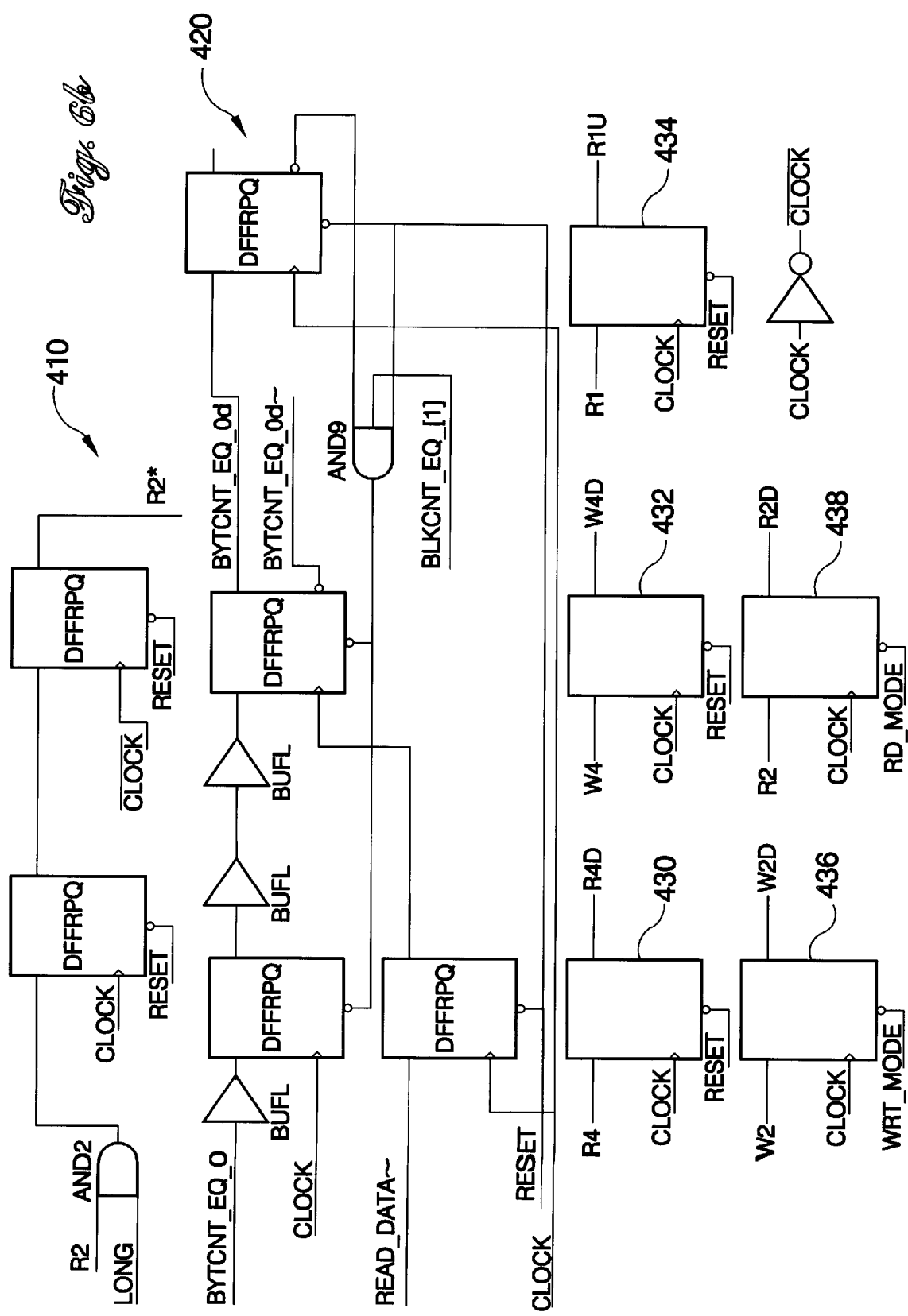

FIG. 3 is a logic diagram showing the structure of the Write State Machine. FIG. 2 is a flow chart showing the operation of the Write State Machine, and FIG. 6 is a logic diagram of showing the control circuitry controlled by the Write State Machine.

In FIG. 3, four flip flops 200–206 are used to keep track of the current state of he Write State Machine 122. The outputs of these flip flops are carried on signal lines Wa, Wa~, Wb, Wb~, Wc, Wc~, Wd and Wd~ to a state decoder 210. "Wa" represents the high order bit and "Wd" represents the low order bit of the Write State Machine's state. The state decoder 210 decodes Wa–Wd~ to provide sixteen signals W0–W15 which represent the current state of the Write State Machine 122. The next state of the Write State Machine 122 is determined bit by bit by gates 220–272 fed by control signals and by Wa–Wd~.

The following signals are used by the Write State Machine in addition to the current state signals W0–W15 to determine the next state 1. WRT_MODE: indicates that write mode has been set
2. OK_to_XFR: indicates that there is space in the buffer for a WRITE command, or that the microcontroller has placed data in the buffer for a READ command
3. OK_to_CONT: indicates that the microcontroller is allowing the command to continue
4. MPLY_DONE: indicates that the update task file state matching has completed its update.
5. LONG: indicates that the command is a LONG command
6. CNT_EQ_0: indicates that the task file count register is equal to zero
7. CNT_EQ_1: indicates that the task file count register is equal to one
8. BLKCNT_EQ_1: indicates that the block count register is equal to one
9. BYTCNT_EQ_0: indicates that the byte count register is equal to zero
10. END_DELAY: indicates that the inter sector delay counter is equal to zero
11. LAST_XFR: indicates that the last sector has been transferred, this signal may be set by the microcontroller to terminate the command between data transfers The function of the Write State Machine will now be described with reference to FIG. 2.

State 0

The Write State Machine remains in state zero as long as write mode is not set. Write mode is set by either an autowrite command, such as WRITE SECTORS, WRITE BUFFER, WRITE DMA, WRITE LONG, WRITE MULTIPLE, or FORMAT, or by the microprocessor. All of these commands (WRITE SECTORS, WRITE BUFFER, WRITE DMA, WRITE LONG, WRITE MULTIPLE, and FORMAT) are, by default, autowrite commands. These commands can be disabled by setting bit 1 (Disable Autowrites) in AT_DATA 1 (register 84). When write mode is set, the Write State Machine moves to state eight.

State 8

In state eight, the Write State Machine initializes the host interface for the WRITE command by resetting read mode. This stops any read operation in progress and forces the Read State Machine to state zero. The Write State Machine also loads the Byte Count register with the size of the sector in bytes and loads the Block Count register with the number of sectors to be transferred in the block. Furthermore, the Write State Machine clears the SAD register, signals the beginning of the write operation, and resets DRQ and the FIFO. The Write State Machine then moves to state C.

State C

In state C, the Write State Machine waits for the "ok to transfer" signal indicating that space is available in the buffer. Space in the buffer is different if the command is a WRITE MULTIPLE as opposed to any other write command. If the command is a WRITE MULTIPLE command, enough sectors are required to be free in the buffer to accommodate the block size. For any other write command, there only needs to be one sector available in the buffer for a transfer to proceed. For all write commands, the Write Segment Size (WSEG) in addition to SAD and SAV are used to determine the availability of the buffer. A write command can be blocked at this time by the microprocessor by resetting the OK to continue bit in the Interface Control 1 Register, 6D bit 4. When space is available, <<MPLY is done,>> and if the microprocessor has not blocked the transfer, the Write State Machine will move to state E.

State E

In state E the Write State Machine initiates the transfer by setting DRQ, which enables IO16 and signals to the host to begin transferring data. Only one block of data may be transferred for each assertion of DRQ. The Write State Machine also resets BUSY, and sets BLK_WUPD~ to prevent the task file from being updated erroneously 20 on the first transfer. If the transfer is a LONG transfer, then the ECC is enabled. The Write State Machine then moves to state 6.

State 6

In state 6 the Write State Machine waits for all bytes in the sector to be transferred by the Host to the buffer. When all of the bytes of the sector have been transferred, the byte count register will equal zero. At that point, the Write State machine branches one of three different ways from state six. If all of the sectors in the command have been transferred, the Byte Count register will equal zero, the Block Count register will equal one, and the Task File Count register will equal one. If the command is not a LONG command, the Write State Machine will move to state 4. Alternatively, if LAST_XFR is asserted, and the command is not a LONG, the Write State Machine will also move to state 4.

State 4

In state four, the Write State Machine finishes up the command. The Write State Machine sets busy, resets DRQ, the updates the Task File, updates the Sectors Available logic, resets IO16, disables ECC transfer, sets transfer done, and resets the last transfer signal. The Write State Machine also resets DMA to allow for the automation (and hence caching) of DMA commands. Finally, the Write State Machine signals the end of the write command by resetting write mode. Resetting write mode returns the Write State Machine to state zero.

State 2

If the command is a LONG command, the Write State Machine will move from state 6 to state 2 after the sector has been transferred to transfer the ECC bytes. In state 2, the Write State Machine will reset IO16, decrement the Block Count register to indicate that one less sector remains to be transferred, and load the Byte Count register with the number of ECC bytes to be transferred. On the next clock cycle, the Write State Machine will return to state 6 and reset the LONG signal. State 6 will proceed as described above until all of the ECC bytes have been transferred. Then, the Write State Machine will go to state 4 because LONG is no longer set. In state 4, the Write State Machine will complete the command and the Write State Machine will move to state zero.

If the command is not a LONG command but rather a MULTIPLE command then there are more sectors to be transferred in the same block, the Task File Count register will not equal 1 (because there are still sectors left to be transferred in the command),and the Block Count register will not equal 1 (because there are still sectors left to be transferred in the block). If LAST_XFR has not been set, the Write State Machine will go from state 6 to state 2 after the first sector has been transferred. Under these conditions, the Write State Machine in state 2 will prepare for another sector to be transferred. The Write State Machine will set the transfer done signal, update the Sectors Available logic, decrement the Block Count register, load the Byte Count register with the number of bytes in a sector, and signal the Update Task File state machine to update the Task File. On the next clock cycle, the Write State Machine will go to state 6, reset LONG, and begin to transfer the next sector. The Write State Machine will continue to alternate between state 6 and state 2 in this fashion until all sectors in the block have been transferred. At that time, after the last sector in the block has been transferred, if there are no more sectors to be transferred, or if LAST_XFR has been set, the Write State Machine will move from state 6 to state 4. In state 4 the command will be completed, and the Write State Machine will go to state zero.

State 7

If, at the end of a transfer of a sector in state 6, there are more sectors to be transferred, but these sectors are in a different block, the task file count register will not equal 1 (because the last sector in the command has not been transferred), and the block count register will equal 1 (because the last sector in the block has been transferred). If LAST_XFR has not been asserted, the Write State Machine will go from state 6 to state 7.

In state 7, the Write State Machine will signal that the previous transfer is done, and prepare to transfer the next block. The Write State Machine will load the Byte Count register with the number of bytes in a sector, signal the Update Task File State Machine to update the Task File, update the Sectors Available logic, set busy, load the Inter Sector Delay counter with the between sector delay time, and set SKCP to indicate to the host that it may again transfer data. The Write State Machine will also reset DRQ so that it may be raised again in state E to request the transfer of another block. On the next clock cycle, the Write State Machine will move to state F State F In state F, the Write State Machine will wait until the inter sector delay time has elapsed. When the appropriate time has passed, the Write State Machine will move to state D.

State D

In state D, the Write State Machine will load the block count register with the number of sectors which will be transferred in the next block. The Write State Machine will then return to state 7 where it will wait until there is space in the buffer before proceeding as previously described. The Write State Machine will then go to state E. For the second transfer and all transfers following the second, state E will proceed as described above, except that BLK_WUPD is not set. Additionally, IRQ is set, and the IRQ timeout timer is started. As with DRQ, the IRQ must be set for each block transfer. Furthermore, if the host does not begin to send data before the IRQ timeout timer times out, IRQ will be reasserted. This is to handle host computers which may miss some assertions of IRQ. The Write State Machine then proceeds to state 6. The Write State Machine will repeat the 6,2,6,2,6, . . . sequence until all sectors in the new block have been transferred, and the Write State Machine will repeat the 7, F, C, D, E, 6 sequence until all blocks have been transferred. At that time, the Write State Machine will go from state 6 to state 4 and to state zero to complete the command.

2. Read State Machine

Figure 5A:
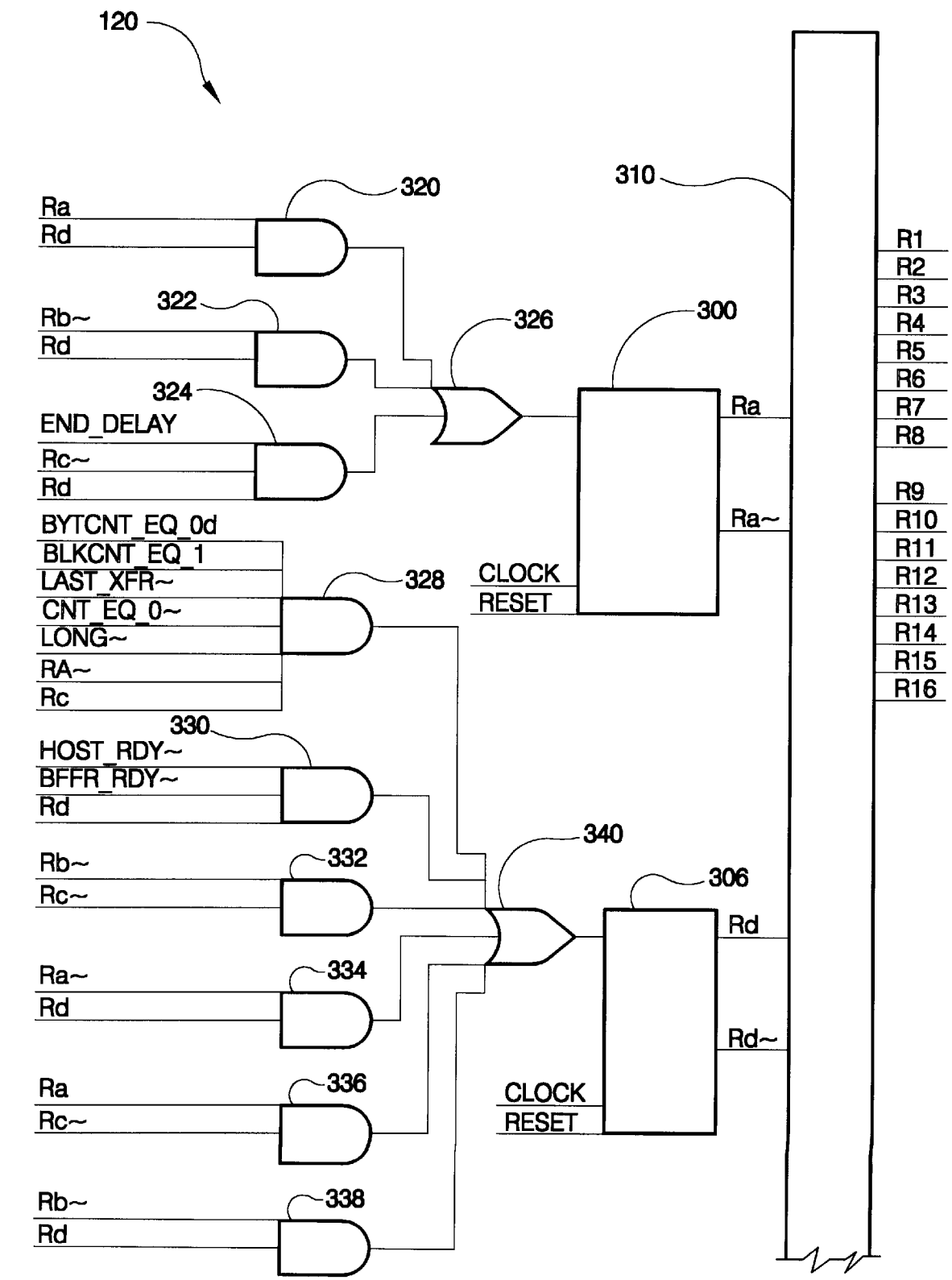
FIGS. 5A and 5B are a logic diagram of the Read State Machine according to the present invention.
Figure 5B:
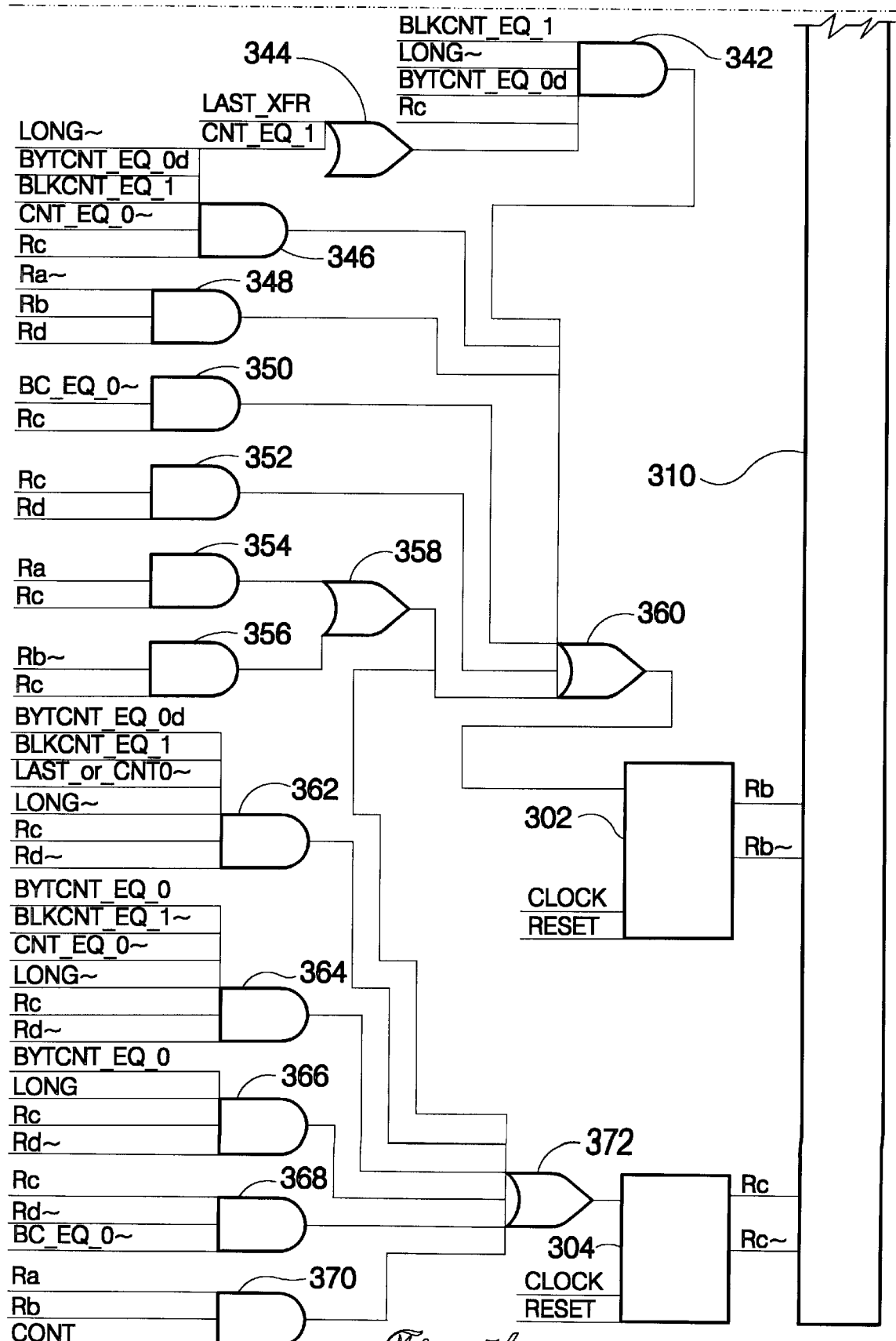

FIG. 5 is a logic diagram showing the structure of the Read State Machine. FIG. 4 is a flow chart showing the operation of the Read State Machine, and FIG. 6 is a logic diagram of showing the control circuitry controlled by the Read State Machine.

In FIG. 5, four flip flops 300–306 are used to keep track of the current state of the Read State Machine 120. The outputs of these flip flops are carried on signal lines Ra, Ra~, Rb, Rb, Rc, Rc~, Rd and Rd~ to a state decoder 310. "Ra" represents the high order bit and "Rd" represents the low order bit of the Read State Machine's state. The state decoder 310 decodes Ra–Rd to provide sixteen signals R0–R15 which represent the current state of the Read State Machine 120. The next state of the Read State Machine is determined bit by bit by gates 320–372 fed by control signals and by Ra–Rd.

The following signals are used by the Read State Machine in addition to the current state signals R0–R15 and the signals described above for the Write State Machine to determine the next state:

1. ARD~: indicates that the host microprocessor is ready to receive data

2. BFFR_RDY: indicates that the buffer is full of data and is ready to transfer
3. RD_MODE: indicates that read mode has been set
4. DMA_CMD: indicates that the command is a DMA command
5. BYT_CNT_EQ_0d: indicates that the byte counter is =0. The d indicates that it was delayed by a clock due to the timing of the circuit.

The operation of the Read State Machine will now be described in reference to FIG. 4

State 0

The Read State Machine is held at state zero until read mode is set. Setting read mode causes the Read State Machine to advance to state one.

State 1

In state one, read initialization occurs. In state 1 the Read State Machine resets write mode. This causes any pending WRITE command to be stopped and sends the Write State Machine back to state 0. Also in state 1, the Read State Machine loads the number bytes in a sector into the BYTE COUNT register, loads the number of sectors in the first (or only) block into the Block Count register, resets DRQ, and resets the FIFO. At the next clock cycle, the Read State Machine updates the task file (via the Update Task File state machine and moves to state 9.

State 9

In state 9 the Read State Machine waits for the microcontroller to indicate that it has finished putting data in the buffer, for MPLY to be done, indicating that the host task file state machine is finished updating the task file and for the Task File to be updated. For read multiples, data in the buffer means that there is one block's worth of sectors in the buffer. The microprocessor can also intervene and cause the state machine to pause at this point by resetting OK to continue in the Interface Control Register 1, 6D bit 4. When data is ready to be transferred, and if the microprocessor has not inhibited the transfer, the Read State Machine moves to state B.

State B

In state B, the Read State Machine strobes the FILL_FIFO signal. This fills the FIFO between the AT block and the buffer prior to starting a transfer. The data is already in the buffer but the FIFO provides a cushion to allow the device block and ECC block to access the buffer during host transfers. On the next clock pulse, the Read State Machine moves to state C.

State C

In state F the Read State Machine waits for the AT FIFO to fill, for the host to indicate that it is ready to receive data, and for the buffer to indicate that it is ready to transfer data. The buffer ready signal indicates that the FIFO is fill. This is the FIFO between the AT interface block and the buffer. When all components are ready for the transfer, the Read State Machine moves to state E.

State E

In state E, the Read State Machine pre-stages the first word of the transfer by issuing Gate 1ST Word, sets DRQ, and resets BUSY. Setting DRQ enables IO16. Also in state E, the IRQ timers are started. The IRQ timer, if it times out, will drop IRQ, wait about a microsecond, and then raise IRQ again. It will be reset if data is read by the host before it times out. This is to handle host BIOS's that do not read status and initialize their interrupt controller before transferring data which leads to IRQ's being missed. If the command is a LONG command, the Read State Machine enables ECC transfer. The Read State Machine moves to state 6 on the next clock cycle.

State 6

In state 6, the Byte Count state machine transfers a sector of data to the host computer. When the sector has been transferred, the Byte Count register will equal zero. At that point, the Read State Machine will move to one of three states depending upon the type on the command.

If there are no more sectors to be transferred in the READ command, and the command is not a LONG command, the Block Count register will equal 1, and the Task File Count register will equal zero. The Read State Machine will move to state 4 at the next clock cycle.

If, the command is a LONG command, the Read State Machine will leave state 6 and go to state 2 to prepare to transfer the ECC bytes.

If the command is a MULTIPLE command, and there are more sectors to be transferred in the block, the Task File Count register will not equal zero (because there are more sectors to be transferred), and the Block Count register will not equal one (because the last sector in the block has not been transferred). In this case, the Read State Machine will move from state 6 to state 2 to prepare for the next sector of information to be transferred.

If the command is a MULTIPLE command, and there are no more sectors to be transferred in the block, the Task File Count register will not equal zero (because there are more sectors to be transferred), and the Block Count register will equal one (because the last sector in the block has been transferred). In this case, if LAST_XFR is not set, the Read State Machine will move from state 6 to state 7 to prepare for the next block of information to be transferred.

State 4

In state four, DRQ, IO16, last transfer, DMA, and enable ECC transfer are reset. INC_START is used to increment the logical block address (LBA) in cases where LBA's are used instead of cylinder head sector and transfer done are set. The Sectors Available logic is also updated. If the command was a READ DMA, Busy is set. Setting busy for DMA commands and resetting DMA allow the Read State Machine to automate DMA commands in the same manner as other commands. On the next clock cycle, the Read State Machine resets read mode, which sends the Read State Machine to state zero to await the next READ command.

State 2

If the command was a LONG command, the Read State Machine will prepare to send the ECC bytes to the host. The Read State Machine resets IO16 and loads the Byte Count register with the number of ECC bytes to be transferred, and issues Gate 1ST Word to signal the Byte Count state machine to stage the first two ECC bytes for transfer to the host. On the next clock cycle, the Read State Machine will reset LONG, and move to state 6. After the ECC bytes have been transferred in state 6, LONG will no longer be set, the Task File count register will equal zero, and the Read State Machine will move to state 4 and to state zero to complete the command.

If the command was a READ MULTIPLE command, the Read State Machine will prepare to transfer the next sector of data in the block to the host. The Read State Machine will set transfer done, update the Sectors Available logic, load the number of bytes in a sector into the Byte Count register. To keep track of the remaining number of sectors to be transferred, the state machine updates the task file, and decrements the Block Count register. On the next clock cycle, the Read State Machine will move to state 6 to transfer the next sector. The Read State Machine will continue to cycle between state 6 and state 2 until all sectors in the block have been transferred. Then, if there are no more blocks to be transferred, the Read State Machine, will move to state 4 and zero to complete the command. If there are more blocks to be transferred, and LAST_XFR has not been set, the Read State Machine will move to state 7.

State 7

In state 7, the Byte Count register is loaded with the number of bytes in a sector, the Block Count register is loaded with the number of sectors to be transferred in the next block, transfer done is set, the Sectors Available logic is updated, busy is set, DRQ is reset, and the Inter Sector Delay counter is loaded with the between sector delay time. The Read State Machine then moves to state 5.

State 5

In state 5 the Read State Machine waits for the between sector delay to end. Then, the Read State Machine moves to state D.

State D

In state D the Read State Machine updates the task file, and then moves to state 9, state B, state F, state E and state 6 as described above to transfer the next sector, and alternates between state 6 and state 2 to transfer all sectors in the block. The Read State Machine follows this loop, moving from state 6 through states 7, 5, D, 9, B, F, and E each time a new block must be transferred. When the last sector of the last block has been transferred, the state machine will move from state 6 to states 4 and zero to complete the command.

3. Control Logic

FIG. 6 is a block diagram which describes the generation of the control signals for the AT interface from the current state signals W0–W15 and R0–R15 and other inputs. The inputs to the control logic consist of the current state signals, signals coming from other parts of the AT interface or drive electronics, and intermediate signals generated by the state machine. These inputs are fed into the control logic circuitry 402.

Based on the inputs, the control logic circuitry 402 produces output signals. These output signals are used to control the AT interface in order to transfer data as described above. Each of the signals will now be described.
1. LD_BYT_CNT~: asserted to load the byte count register with the number of bytes in a sector
2. LD_BLK_CNT~: asserted to load the block count register with the number of sector in a block
3. SET_DRQ~: asserted to set the DRQ signal
4. RST_DRQ~: asserted to reset the DRQ signal
5. WR_START~: asserted to indicate the start of a write operation
6. BLK_1ST_IRQ: prevents an IRQ on the first sector transfer on a write
7. BLK_WUPD~: prevents the task file from being updated on the first sector transfer on a write
8. FIFO_GO: asserted to reset the FIFO. This FIFO is between the AT block and the data buffer
9. FILL_FIFO~: asserted to signal the FIFO to fill with data. This FIFO is between the AT block and the data buffer
10. RST_SAD~: asserted to clear the Sectors Adjust Register. The Sectors Adjust Register allows write caching.
11. EN_ECC_XFR~: asserted to enable the ECC for a LONG command
12. RST_ECC_XFR~: asserted to disable the ECC after a LONG command
13. SET_BUSY~: asserted to indicate that the drive is busy
14. RST_BUSY~: asserted to indicate that the drive is not busy
15. SET_IRQ~: asserted to raise IRQ in the AT interface
16. START_IRQ_TO~: asserted to start the IRQ timeout timer.
17. XFR_DON~: asserted to signal the end of the transfer
18. LD_BS_DLY~: asserted to load the between sector delay into the inter sector delay counter
19. UPD_TASK: asserted to signal the Update Task File state machine to update the task file
20. INC_XFR_REL~: asserted to increment the transfer release, which updates the Sectors Available logic and decrements the SAV register
21. RST_IO16~: asserted to reset the IO16 signal
22. RST_LONG~: asserted to reset the LONG signal
23. DEC_BLK_CNT: asserted to decrement the block count register
24. RST_WM~: asserted to signal the end of the write operation and reset write mode
25. RST_RM~: asserted to signal the end of a read operation and reset read mode
26. RST_WLXFR~: asserted to signal the end of a write operation and reset the last transfer signal
27. RST_DMA~: asserted to reset the DMA signal
28. SET_SKCP: the state machine sets this. It is used by the host to indicate that the drive is not seeking
29. INC_START: asserted to start the transfer
30. GATE_1ST_WORD: is asserted to instruct the Byte Counter State Machine to transfer the first two bytes of data from the buffer to the data register.
31. FIRST_OP: asserted to signal that the first two bytes of data are being transferred
32. BC_EQ_0~: an intermediate signal used by the Read State Machine to determine its next state.
33. START_CNT: asserted to instruct the inter sector delay counter to begin counting
34. STOP_CNT: asserted to instruct the inter sector delay counter to stop counting The inputs to the control logic will now be described.
1. WRT_MODE: indicates that a write operation is active
5. LONG: indicates that the command is a LONG command
6. CNT_EQ_0: indicates that the task file count register is equal to zero
7. CNT_EQ_1: indicates that the task file count register is equal to one
8. BLKCNT_EQ_1: indicates that the block count register is equal to one
9. BYTCNT_EQ_0: indicates that the byte count register is equal to zero 10. BYTCNT_EQ_0d: intermediate signal used by the Read State Machine
15. RD_MODE: indicates that read operation is active
16. DMA_CMD: indicates that the command is a DMA command
17. FIRST_READ: indicates that the first two bytes of data are being transferred in a READ command
18. FIRST_WRITE: indicates that the first two bytes of data are being transferred in a WRITE command
19. R1U: a delayed read state 1 signal used to generate a delayed update task signal coming out of state 1 of the Read State Machine
20. R4D: a delayed read state 4
21. W4D: a delayed write state 4
22. R2D: a delayed read state 2
23. W2D: a delayed write state 2
24. R2*: a delayed and gated read state 2 for a LONG command The control logic circuitry consists of combinational logic and may be implemented in a variety of ways, for example as discrete logic elements, or in programmable logic. The equations used by the control logic circuitry 402 to generate the output signals are:

LD_BYT_CNT~=R1+R2+R7+W2, W7, W8
LD_BLK_CNT~=R1+R7+W8+WD
SET_DRQ~=WE+RE
RST_DRQ~=W8+W7+R7+R4+W4+R1
WR_START~=W8
BLK_1ST_IRQ=W8
BLK_WUPD~=WE * FIRST_WRITE
FIFO_GO=W8+R1
FILL_FIFO~=R8
RST_SAD~=W8
EN_ECC_XFR~=(WE * LONG) +(WE * LONG)
RST_ECC_XFR~=R4+W4
SET_BUSY~=W4+W7+R7+(R4 * DMA)
RST_BUSY~=RE+WE
SET_IRQ~=(RE * ~FIRST_WRITE)+(WE * ~FIRST_WRITE)
START_IRQ_TO~=(RE * ~FIRST_WRITE)+(WE * ~FIRST_WRITE)
XFR_DON~=R4+W4+R7+W7+(R2 * LONG)+(W2 * ~LONG)
LD_BS_DLY~=R7+W7
UPD_TASK=W7+RD+W4+(R2 * LONG)+(W2 * LONG)
INC_XFR_REL~=W4+R4+W7+R7+(R2 * ~LONG)+ (W2 * ~LONG)
RST_IO16~=W4+R4+(R2 * LONG)+(W2 * LONG)
RST_LONG~=W2D+R2D
DEC_BLK_CNT=W2+(R2 * LONG)
RST_WM~=R1+W4D
RST_RM~=W8+R4D
RST_WLXFR~=W8
RST_DMA~=W4+R4
SET_SKCP=W7
INC_START=R4
GATE_1ST_WORD=RE+R2*
FIRST_OP=FIRST_WRITE+FIRST_READ
BC_EQ_0~=[BYTCNT_EQ_0 * ~(BLKCNT_EQ_1+CNT_EQ_0)]+[BYTCNT_EQ_0 * BYTCNT_EQ_0d * (CNT_EQ_0+BLKCNT_EQ_1)]
START_CNT=R7+W7
STOP_CNT=R9+WC
CNT_EQ_0~=~(CNT_EQ_0)
CNT_EQ_1~=~(CNT_EQ_1)
BLKCNT_EQ_1~=~(BLKCNT_EQ_1)
BYTCNT_EQ_0~=~(BYTCNT_EQ_0)

With these equations, a person of ordinary skill in the art will be able to choose an exact physical implementation of the control logic necessary to produce the proper control signals for the Read and Write State Machines.

FIG. 6 also shows the generation of several other intermediate signals. Particularly, the generation of R2* is shown as the output of flip flop circuit. BYT_CNT_EQ_0d is shown being generated as the output of flip flop circuit 420. The signals R4D, W4D, R1U, W2D, and R2D are shown as the outputs of flip flop circuits 430, 432, 434, 436, and 438 respectively. Furthermore, Set-Reset latch circuits 440–448 are used to store the current values of the intermediate variables HOST_RDY~, LAST_XFR, EN_ECC, FIRST_WRITE, and FIRST_READ respectively.

The operation and construction of the Read State Machine and Write State Machine of the present invention have now been described. With the foregoing information, a person with ordinary skill in the art could construct Read and Write state machines for use in an improvement to an AT interface of the type described in the prior art reference cited above. Other features and advantages of the present invention may become apparent to a person of skill in the art who studies the present invention disclosures. Therefore, the scope of the present invention is to be limited only by the following claims.

What we claim is:

1. An interface apparatus, within a storage system, for controlling the transfer of sectors of data between a host processor and a buffer within the storage system in response to a READ and WRITE command issued by the host processor, said apparatus comprising:
   a Byte Count state machine,
   an Update Task File state machine,
   a Read State Machine comprising
      means for automating a READ DMA command and a means for automating a READ DMA MULTIPLE command from said host processor; and
      at least a first state and a second state wherein said Read State Machine requires only one state time between the transfer of each sector during a READ DMA MULTIPLE command such that said Read State Machine transistions between said first and second state until all sectors in a block have been transferred including transferring a first sector in said first state, transistioning to said second state on a first clock cycle, decrementing a Block Count register and loading a Byte Count register in said second state, and returning to said first state on a second clock cycle to transfer a second sector; and
   a Write State Machine comprising
      means for automating a WRITE DMA command, a multiplicity of autowrite DMA commands, and a WRITE DMA MULTIPLE command; and
      at least a third state and a fourth state wherein said Write State Machine requires only one state time between the transfer of each sector during a WRITE DMA MULTIPLE command such that said Write State Machine transistions between said third state and fourth states until all sectors in a block have been transferred including transferring a third sector in said third state, transistioning to said fourth state a third clock cycle, decrementing said Block Count register and loading siad Byte Count register in said fourth state, and returning to said third state on a fourth clock cycle to transfer a fourth sector.

2. An interface apparatus according to claim 1 wherein said automating means of said Read State Machine comprises means for resetting a DMA signal and for setting a BUSY signal at the completion of a READ DMA command, and said automating means of said Write State Machine comprises means for resetting a DMA signal at the completion of a WRITE DMA command.

3. An interface apparatus, within a storage system, for controlling the transfer of sectors of data between a host processor and a buffer within the storage system in response to a READ and WRITE command issued by the host processor, said apparatus comprising, a Byte Count state machine, an Update Task File state machine, a Read State Machine comprising:
   means for terminating said READ command between blocks in a READ MULTIPLE command, and
   seven states wherein said Read State Machine requires only seven state times between the transfer of each block including:
      a first state providing the transfer of a first block;
      a second state following said first block wherein a Byte Count register and a Block Count register are loaded;
      a third state following said second state wherein said Read State Machine delays for a predefined delay;
      a fourth state following said third state wherein an update task file is updated;
      a fifith state following said fourth state wherein said Read State Machine waits for an indication to proceed;
      a sixth state following said fifth state wherein a FIFO is filled;
      a seventh state where a plurality of ready signals are received to initiate a transition to an eight state where IRQ timers are started indicating a transitions back to said first state for the transfer of a second block; and a Write State Machine comprising:
   means for terminating said WRITE command between sectors in a WRITE command; and
   five states wherein said Write State Machine requires only five state times between the transfer of each block including:
      an eighth state providing the transfer of a third block;
      a ninth state following said eighth state wherein said Byte Count register is loaded, an Inter Sector Delay counter is loaded and DRQ is reset;
      an eleventh state following said fifth state wherein said Write State Machine waits for a predefined delay
      a twelveth state wherein said Block Count register is loaded;
      a thirteenth state wherein Write State Machine waits unitl there is available space for transfer;
      a fourteenth state where a DRQ is set and IRQ timers are started indicating a transitions back to said eithgth state for the transfer of the second block.

4. An interface apparatus according to claim 3 wherein said terminating means of said Read State Machine comprises means responsive to a last transfer signal, and said terminating means of said Write State Machine comprises means responsive to a last transfer signal.

5. An interface apparatus, within a storage system, for controlling the transfer of sectors of data between a host processor and a buffer within the storage system in response to a READ and WRITE command issued by the host processor, said apparatus comprising, a Byte Count state machine, an Update Task File state machine, a Read State Machine, and a Write State Machine, wherein
   said Read State Machine requires only one state time between the transfer of each sector, or between the transfer of a sector and ECC data, and only seven state times between the transfer of each block, including accessing a second state following the transfer of data in said first state during a MULTIPLE READ command, decrementing a Block Count register and loading a Byte Count register in the second state, and returning to said first state; and
   said Write State Machine requires only one state time between the transfer of each sector, or between the transfer of a sector and ECC data, and only five state times between the transfer of each block including accessing a fourth state following the transfer of data in said third state during a MULTIPLE WRITE command decrementing a Block Count register and loading a Byte Count register in the fourth state, and returning to said third state.

6. The interface apparatus of claim 5, further comprising,
means for resetting said Write State Machine at the beginning of said READ command, and
means for resetting said Read State Machine at the beginning of said WRITE command.

7. The interface apparatus of claim 5, wherein,
the Read State Machine, further comprising
   means for resetting said Write State Machine at the beginning of said READ command,
   means for automating a DMA command and a READ DMA MULTIPLE command from said host processor, and
   means for terminating said READ command between blocks in a READ MULTIPLE command; and
the Write State Machine, further comprising
   means for resetting said Read State Machine at the beginning of said WRITE command,
   means for automating a DMA command, an auto-write DMA command, and a WRITE DMA MULTIPLE command from said host processor, and
   means for terminating said WRITE command between sectors in a WRITE MULTIPLE command.

8. An interface apparatus according to claim 7 wherein said automating means of said Read State Machine comprises means for resetting a DMA signal and for setting a BUSY signal at the completion of a READ DMA command,
said terminating means of said Read State Machine comprises means responsive to a last transfer signal,
said automating means of said Write State Machine comprises means for resetting a DMA signal at the completion of a WRITE DMA command, and
said terminating means of said Write State Machine comprises means responsive to a last transfer signal.

* * * * *